Figure 5:
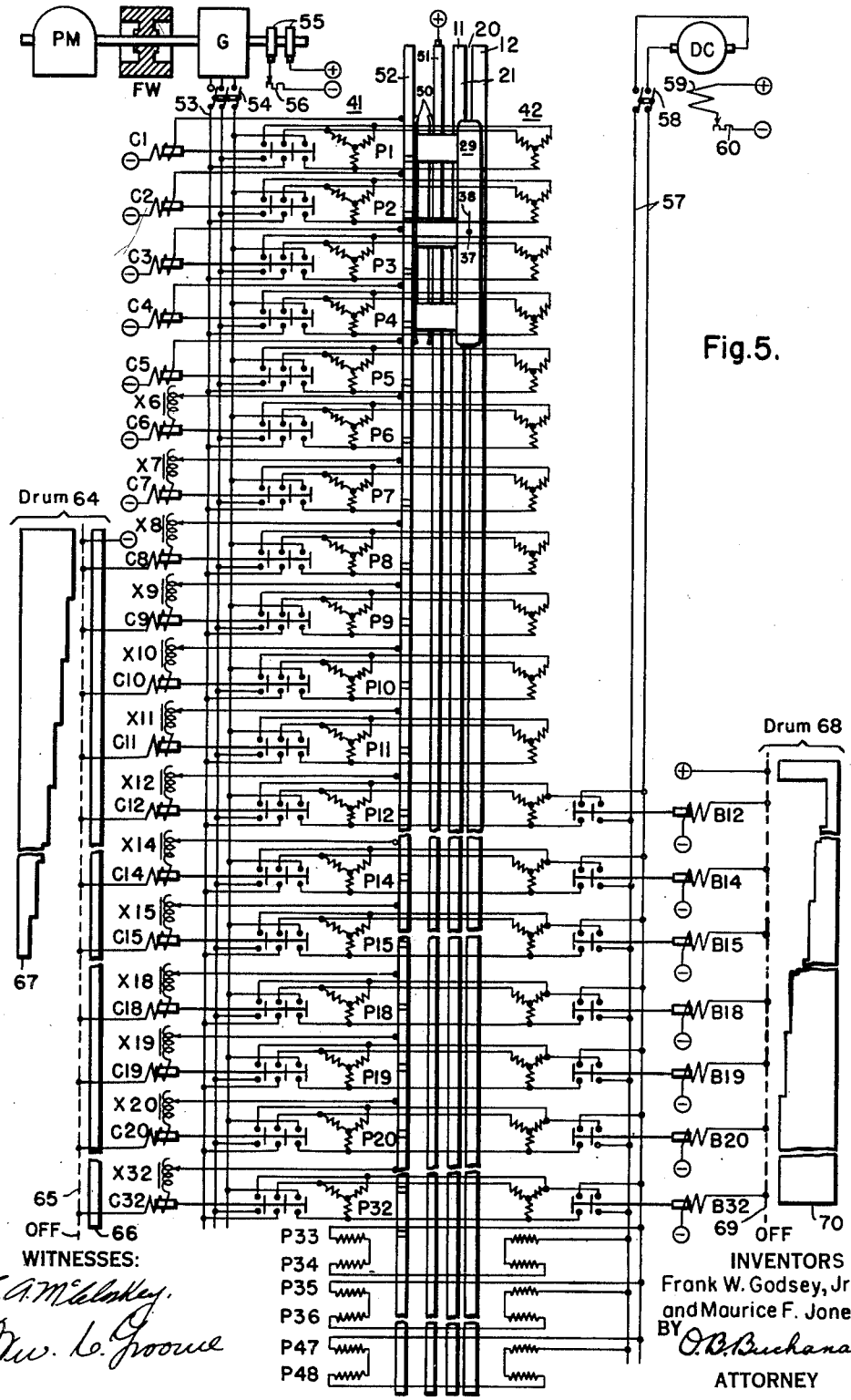

Jan. 19, 1954  F. W. GODSEY, JR., ET AL  2,666,879
LINEAR MOTOR ASSEMBLY FOR CATAPULTS AND THE LIKE
Filed Sept. 15, 1950  2 Sheets-Sheet 1
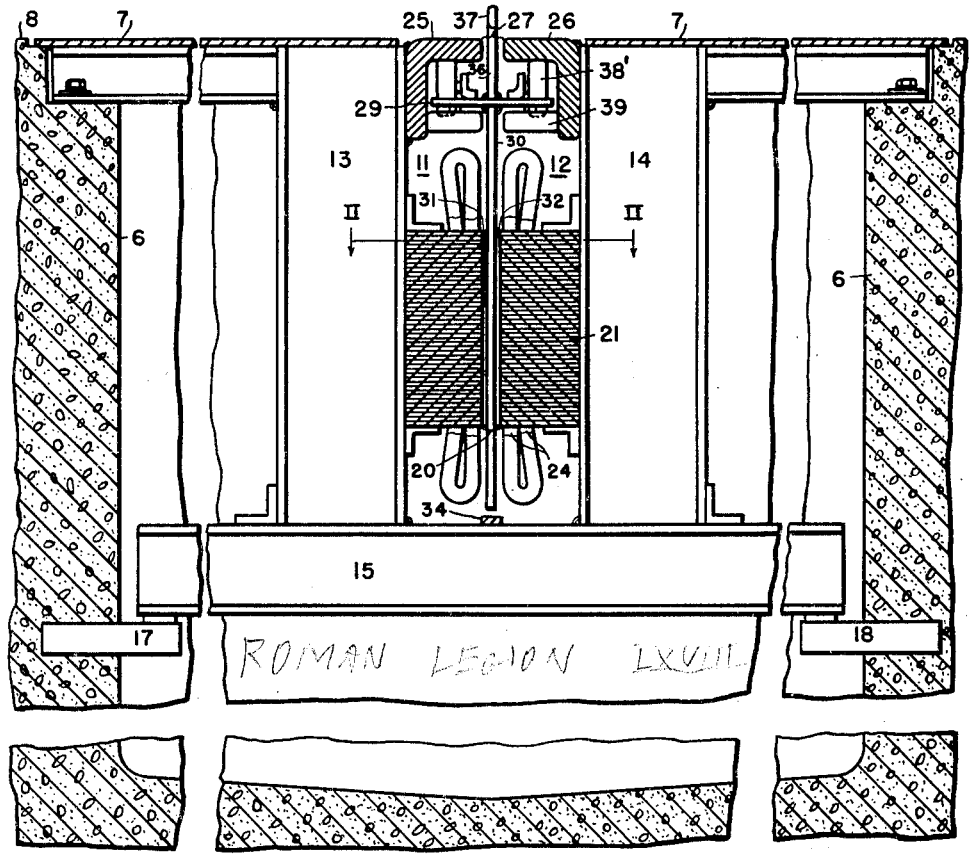
Fig.1.
Fig.2.
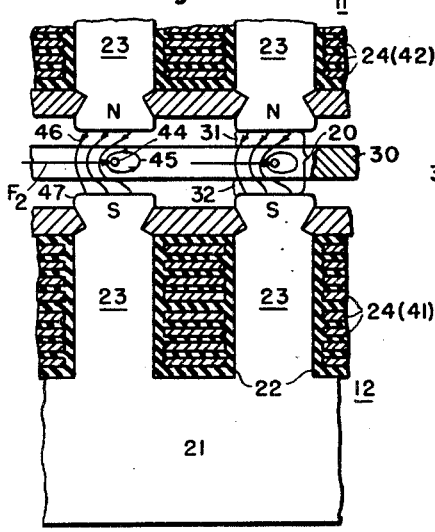
Fig.3.
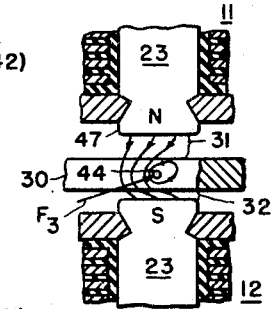
Fig.4.
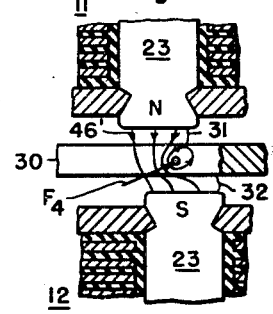
INVENTORS
Frank W. Godsey, Jr.
and Maurice F. Jones.
BY O. B. Buchanan
ATTORNEY Patented Jan. 19, 1954

2,666,879

UNITED STATES PATENT OFFICE 2,666,879

LINEAR MOTOR ASSEMBLY FOR CATAPULTS AND THE LIKE

Frank W. Godsey, Jr., and Maurice F. Jones, Pittsburgh, Pa., assignors to Westinghouse Electric Corporation, East Pittsburgh, Pa., a corporation of Pennsylvania Application September 15, 1950, Serial No. 185,126

20 Claims. (Cl. 318—135)

Our invention relates to improvements in linear-motor assemblies whereby the maximum acceleration (and deceleration) of the linear-motor car may be obtained, in the most practicable manner which is applicable to catapults for use in launching and landing airplanes.

In accordance with our invention, a relatively short skeletonized shuttle-car is mounted to run on a substantially straight trackway at considerable length. This car has a depending vertical plate, which extends for substantially the length of the car. The plate is made altogether of non-magnetic conducting material, and it moves in a slot which is formed between two substantially identical (or mirror-image), inwardly facing, polyphase-wound magnetizable stator-members, which extend the entire useful length of the plane-accelerating portion of the trackway. The stator member is the primary member of the linear motor, and the depending vertical plate of the car is the secondary or armature-member. Means are provided for energizing the polyphase stator windings in sections to match the armature-position.

If the two inwardly facing magnetizable primary members are identical and symmetrically disposed, the armature-plate of the shuttle-car automatically centers itself within the slot between the two primary members, so as to make the two linear-motor airgaps equal, so that there is the same spacing between each face of the armature-plate and the airgap-face of the magnetizable stator core on that side of the plate. In order that this armature-centering effect may be obtained, it is necessary that, at all instants and at all places along the plate, wherever there is a north pole on one side of the plate, there shall be a south pole of substantially equal strength, substantially exactly opposite to said north pole, on the other side of the plate. The inwardly facing primary-members usually have winding-receiving slots, which are separated by teeth, on the airgap-faces of said primary-members, in which case, if the secondary plate is to be centered in the slot between the airgap-faces of the primary-members, the primary teeth must be so disposed that each tooth of one primary-member is substantially exactly opposite to a corresponding tooth of the other primary-member, throughout the entire useful length of the trackway.

With a linear-motor structure of the nature just described, and with a given limited amount of generating-capacity as a source of power, it is possible to obtain something like 20 or 25% faster acceleration than has ever before been possible, in any plane-launching catapult.

A further advantage of our invention is that it readily adapts itself to extremely rapid braking, which is obtained by a short length of track, at the run-terminating end, which is provided with direct-current windings on the two inwardly facing stator-members.

In general, any plane-launching catapult, for assisting take-offs, should be useful also for assisted landings, and our present type of linear-motor structure lends itself admirably to such purposes, as will be hereinafter described.

With the foregoing and other objects in view, our invention consists in the combinations, assemblies, machines, structures, parts, and methods of design and operation, hereinafter described and claimed, and illustrated in the accompanying drawings, wherein Figure 1 is a simplified exemplary cross-sectional view of the ditch in which our linear-motor assembly is mounted, Fig. 2 is a horizontal sectional view on the section-plane indicated by the line II—II in Fig. 1, showing the manner in which a driving-force is imparted to the armature-plate of the shuttle-car, Fig. 3 is a view, similar to Fig. 2, showing the self-centering effect, if the armature-plate should be displaced out of its central position between the two stator members, Fig. 4 is a similar view showing the decentering effect of stator-teeth or stator-poles which are not exactly opposite to each other, and Fig. 5 is a much simplified diagrammatic view of electrical circuits and apparatus illustrating a complete catapult which is useful for both plane-launching and plane-landing.

Our linear-motor assembly is illustrated as being mounted within a trench or ditch 6, which may be covered by suitably supported top-plates 7 which are flush with the top-surface 8 of a landing-field. Running the entire useful length of the ditch 6 are two substantially identical, vertically disposed, inwardly facing, polyphase-wound, magnetizable primary members 11 and 12. The mounting-structure for these primary members 11 and 12 is illustrated as comprising a series of vertically disposed I-beams 13 and 14, which are secured in pairs to the tops of a series of horizontally disposed I-beams 15 which rest on shelves 17 and 18 which are secured to the sidewalls of the trench 6.

As shown in Figs. 1 and 2, the two inwardly facing stationary primary members 11 and 12 are separated by a slot 20. Each of these members 11 and 12 consists of a laminated magnetizable core 21, which is provided with winding-receiving slots 22 (Fig. 2) on its airgap-face, these slots 22 being separated by teeth 23. As shown in Fig. 2, the slots 22 carry the winding-conductors 24.

The tops of the two series of vertical I-beams 13 and 14 are secured to two inwardly facing angle-iron beams 25 and 26, which are separated by a slot 27 which is flush with the top-surface 8 of the landing-field.

These two inwardly facing angle-irons 25 and 26 serve as the guiding-structure for a short skeletonized shuttle or towing-car, which consists essentially of a horizontal plate 29 having a centrally disposed depending non-magnetizable metal palte 30 extending for substantially the length of the car. The depending copper plate 30 extends down through the slot 20 between the two stationary primary members 11 and 12, so as to provide the two linear-motor airgaps 31 and 32 which are disposed between the respective faces of the depending plate 30 and the respective primary members 11 and 12. The depending plate 30 extends suitable distances above and below the stationary cores 21, so as to provide ample room for the flow of bands of eddy-currents induced by the stator-pole.

The metal plate 30 thus acts as a secondary or armature-member of the linear motor. In general, an alloy of fairly high resistivity is desirable for the plate 30, in order to give a fairly high slip and a good starting-force. This armature-plate 30 should be composed substantially, and preferably altogether, of non-magnetizable material, so that it will reduce leakage-flux difficulties, and also will have an extremely desirable strong self-centering action which will be subsequently described in connnection with Figs. 2, 3 and 4. This plate 30 may be either a solid plate, as illustrated, or it may be a suitable grid or squirrel-cage structure. It may be either a single depending plate, or several depending plates in alignment with each other, edge-to-edge, in order to avoid warping or buckling troubles. The plate 30 is usually sufficiently flexible to permit it to have the self-centering action which holds it centered within the slot 20 between the two primary members 11 and 12, but if greater flexibility is desired, the top portion of the plate 30, above this slot 20, may be weakened by suitable cutaway portions or slots (not shown), the only essential being that there shall be sufficient flexibility, which we have assumed to be inherent in the small thickness of the plate itself.

In the deenergized condition of the linear-motor structure, the bottom edge of the depending plate 30 may rest on a longitudinally extending bar 34 which is carried by the cross-beams 15, thus supporting the weight of the car 29 when the apparatus is not in service, or it may rest on wheels (not shown).

The horizontal plate 29 of the car has an upstanding centrally disposed bracket-arm 36 which extends up through the slot 27 in the surface of the airfield, and terminates, at its top, in a towing-hook 37, as shown in Fig. 1.

When the car is in use, as shown in Fig. 5, the towing-hook 37 is engaged by a suitable plane-accelerating or plane-retarding member or structure, which we have illustrated as a towing-rope 38. This places an upward thrust or pull on the shuttle-car 29, as is well known.

As shown in Fig. 1, the upward thrust of the car is carried by vertical wheels 38' which engage the top horizontal flanges of the angle-irons 25 and 26. The car 29 may be guided laterally by means of horizontal wheels 39 which engage the vertical flanges of the angle-irons 25 and 26, respectively, as shown in Fig. 1.

In Fig. 5, the two primary members 11 and 12 are indicated diagrammatically, by means of two juxtapositioned elongated rectangles representing the cores 21, and two columns of diagrammatically indicated windings 41 and 42 which are offset to the left and right, respectively, of the left and right-hand cores 21. The primary-windings 41 and 42 are wound in a plurality of separately energizable sections, which are indicated as successively numbered poles from P1 to P48 (for example), although it is to be understood that each section may embrace more or less than a single pole. Each section, such as P1, comprises two exactly equal and opposite sections of the primary cores 21 of the two primary members 11 and 12. These two core-sections which are included in each of the poles P1 to P48 must be perfectly symmetrical, so that a tooth 23 (Fig. 2) on one side of the primary-member slot 20 is substantially exactly opposite to a corresponding tooth of the other primary member, on the other side of said primary-member slot 20, throughout the entire useful length of the trackway, as shown in Fig. 2.

The two primary-winding sections which make up each of the poles P1 to P48 must also be perfectly symmetrical in the sense that they are so wound that they act jointly to send flux across the primary-member slot 20, so that, at all instants and at all places along the entire length of the primary-members, wherever there is a north pole on one side of the slot 20, there is a south pole of substantially equal strength, substantially opposite to said north pole, on the other side of the said slot 20.

Each of the first thirty-two stator poles P1 to P32 (for example) has a polyphase winding which may be either a three-phase winding (as illustrated in Fig. 5), or a two-phase winding, or a polyphase winding having any other number of phases. The effect of these polyphase windings is to produce a progressively traveling field, so that successively following north and south poles travel down the field at a rate which is necessarily higher than the rate at which the car 29 is to be drawn along. Since the traveling or moving field is traveling or moving faster than the car 29, it sets up eddy-currents in the armature-plate 30 of the car, and these eddy currents react with the field to powerfully draw the car along the trackway, tending to make the car move at a speed approaching a synchronous speed which woud be identical with the speed of movement of the traveling field.

It will be understood that the total number of poles or sections P1 to P48 may be anything that may be required, the number forty-eight being merely by way of illustration. The major portion of the trackway 25—26, or rather the major portion of the two associated primary members 11 and 12, from the starting-point of the car 29 to a point near the end of the trackway, is wound with polyphase windings, which are indicated, in Fig. 5, as comprising poles P1 to P32. Again, the precise number of poles is chosen by way of giving an illustrative example, and not be way of limitation.

When the linear motor or catapult is designed to operate only in one direction, as when it is used on an aircraft-carrier, or when it is used on a land-based field where the prevailing wind is in one direction, the run-terminating end of the field will never be used for any purpose other than for braking the car 29; and in such a case the last portions of the primary members, from pole 33 to pole 48 in the illustration given in Fig. 5, are wound with direct-current windings so as to produce alternately a north pole followed by a south pole, and so on down the rest of the field. By the time the eddy-current plate 30 of the car 29 reaches the first pole P33 of the direct-current windings, the car will be traveling very fast, so that strong eddy-currents will be set up in this plate 30, by reason of its passage through the direct-current field, thus producing a very powerful braking action.

It is an important feature of our invention that the eddy-current or armature plate 30 shall not only be non-magnetic itself, but that it should have very little or no iron or other magnetizable material associated with it, so that the entire armature, which extends in the primary-winding slot 20, between the two inwardly-facing primary members 11 and 12, shall be made, preferably altogether, but at least essentially, of non-magnetizable material. If there were any magnetizable material in this armature-plate 30, and if that magnetizable material ever got over closer to one of the poles, or to one of the flux-carrying teeth 23, as indicated by the relatively small airgap 32 in Fig. 3, that magnetizable material would be attracted to the stationary pole on the side of the small airgap 32, due to leakage flux, with a force which would be larger than the attractive force of the other pole, which is on the side where there would be a relatively large airgap 31, as shown in Fig. 3. With our altogether or essentially non-magnetic or non-magnetizable armature-plate 30, there is no such decentering force, tending to move the armature away from its exact central position between the two opposite poles or between the two opposite flux-carrying teeth 23, at any point or at any instant of time, so long as the previously described symmetry is maintained, whereby a north-pole tooth N, on one side of the armature 30, is precisely matched by a south-pole tooth S, of equal strength, exactly opposite to, or across from, the north-pole tooth N, and having the same polestrength.

This important automatic self-centering armature-reaction results from the effect of the eddy-currents which are induced in the non-magnetizable armature-plate 30. These eddy-currents set up armature-poles which present an armature north-pole on the side toward the stationary north-pole, and an armature south-pole on the side toward the stationary south-pole, so that the armature is repelled from both of the stationary poles. The two repellant forces are equal when the two opposite stationary pole-strengths are equal to each other, and when the armature is centered or equi-distant between the two opposite stationary poles. If the armature should get closer to one of the two opposite stationary poles than to the other, then the repellent action on that side would be larger than on the other side, thus tending to return the armature to its central position.

The above-described armature-centering action can perhaps be better understood by reference to Figs. 2 to 4. In Fig. 2, two successive pairs of opposite stator-core teeth 23 are shown. Each of the small circles 44 represents an element of the armature-plate, carrying current toward the observer. The ellipse 45 represents the flux-lines surrounding the current-element 44. The flux-lines which are sent from each stationary north-pole tooth 23 to the opposite south-pole tooth 23 are indicated at 46. The conductor-element 44 tends to move away from the denser field, and is therefore in equilibrium laterally, when it is at the center-point between the opposed north and south-pole teeth 23, as shown in Fig. 2. Under these conditions, the force $F_2$ which acts upon the armature-element 44 is exactly in line with the car-movement, with no component tending to move the armature 30 to the one side or the other, as indicated in Fig. 2.

In Fig. 3, we have illustrated the self-centering action which is produced whenever, for any reason, the armature-plate 30 gets out of its above-described central position. In Fig. 3, the armature 30 is closer to the south pole S than the north pole N, and it is evident that the denser field is on the side toward the south pole S, as is diagrammatically indicated, not to scale, in Fig. 3. The current-carrying element 44 still tends to move away from the densest portion of the field, and hence, in Fig. 3, the force $F_3$ which acts upon the current-carrying armature-element is not in the same line as the direction of movement of the armature or car, but it has a component tending to strongly move the armature 30 away from the closely spaced south pole S, and over toward the opposite north pole N, thus strongly forcing the armature 30 back into its central position, such as was shown in Fig. 2.

In Fig. 4, we have shown what happens when the primary-winding field-flux 46' is not symmetrical, due to the displacement of the south pole S, in the direction of car-movement, in advance of the corresponding north pole N, on the other side of the armature-plate 30. In this case, when the armature-plate 30 is centered midway between the opposite north and south-pole teeth 23, the densest field is toward the advanced-position south pole S, so that the force $F_4$ which acts on any current-carrying element of the armature is not in line with the direction of movement of the armature, but has a component tending strongly to move the armature 30 away from the forward-position tooth 23, or away from the south-pole tooth S as shown in Fig. 4, thus decentering the armature, rather than centering the same.

It is thus seen that our invention, when properly designed with perfectly symmetrical primary-cores and primary-windings, produces a strong armature-centering action, keeping the armature-plate 30 in a mid-position at the center of the primary-winding slot 20, so that the two linear-motor airgaps 31 and 32, on opposite sides of the armature-plate 30, are equal. Since it is necessary to develop extremely large longitudinally acting forces $F_2$, $F_3$, and $F_4$, for powerfully accelerating the car in its direction of movement, it will be obvious that any slight lateral component of such forces, as indicated by the inclined force-lines $F_3$ and $F_4$ of Figs. 3 and 4, will produce an extremely strong force-component, acting laterally on the armature-plate 30. These laterally acting force-components, when our two primary-members 11 and 12 are properly designed, as shown in Fig. 3, are sufficient to hold each portion of the armature-plate 30 in substantially the precise center of the primary-member slot 30.

Consequently, no guiding-means are necessary for the purpose of holding the armature-plate 30 centrally disposed within the primary-member slot 20, whenever the two primary members 11 and 12 are identically energized and symmetrically designed, as above explained. When the two opposed primary members are deenergized, the car is either at standstill, or about to be braked, so that any contact with the pole-faces on either side of it would do no harm. The pole-faces of the teeth 23 are commonly rounded, at their ends, as indicated at 47, so that the advancing edge of the plate 30 would not catch on a pole-face or tooth-face, even though the plate were rubbing up against one or the other of the two stationary primary members 11 or 12.

The explanations which have just been given, with reference to Figs. 2, 3 and 4, showing the important self - centering armature - reaction which is obtained when the primary or stator core-teeth 23 are disposed exactly opposite to each other and are equally and oppositely energized, so as to produce opposed, equal-strength, north and south poles at any instant, are equally applicable to the poles of the primary-windings 41 and 42 (Fig. 5), as well as to the individual stator-core teeth 23 which are shown in Figs. 2, 3 and 4. Thus, Figs. 3 and 4 could equally well be regarded as representing poles, rather than merely teeth, and thus it will be seen that the same remarks and requirements which have been explained in regard to the necessary symmetry of the teeth are also applicable to the symmetry of the poles which are opposite to each other, across the stator-member slot 20.

As is illustrated at the top in Fig. 5, the most desirable power-source for our linear-motor catapult will usually be a flywheel-set, which is indicated as comprising some sort of prime mover PM, driving a flywheel FW, which drives a polyphase generator G, as broadly described and claimed in the Jones Patent 2,508,167, granted May 16, 1950. This is so, because each operation of the linear-motor catapult requires only a few seconds of time, something like two or three seconds, more or less, in some instances. During this operating-time, the generator G can draw a considerable portion of its energy from the flywheel FW, reducing the speed of the flywheel by as much as 25 to 40%, in some cases, while the shuttle-car 29 is being accelerated by the application of a polyphase field to the stator-windings.

This will mean, of course, a falling off of the generator-frequency at the very time when the car-speed is increasing, but this falling-off of frequency can be compensated for by making the lengths of the poles longer and longer, at the more advanced points along the trackway, so that the speed of the traveling polyphase field, at the final take-off point, corresponding approximately to pole P32, at the end of the launching-period, will be some 10 to 15% higher than the desired car-speed, for launching a plane.

As pointed out in the Powers Patent 2,404,984, granted July 30, 1946, it is desirable that the starting-point poles, such as P1 to P7, or thereabouts, should be the shortest in length or pole-pitch, so as to reduce the rate of progression or traveling of the field at the time when the car is being started from standstill. This shorter initial pole-pitch is desirable, even aside from questions of generator-frequency, in order to have a more slowly traveling polyphase field at the start, than at the finish of the launching-operation. When the initial generator-frequency is higher than the final generator-frequency, a still greater reduction in the initial pole-pitch should be made, in order to compensate for the frequency-change.

The pole-pitch of the direct-current portion of the primary-windings 41 and 42, corresponding to poles P33 to P48 in Fig. 5, can be anything which is convenient, beause here the eddy-current induction in the armature-plate 30 is dependent, not on the traveling field, which is now stationary, but on the speed of the car. Usually, it will be desirable to wind the direct-current windings, at P33 to P48, with a pole-pitch which is intermediate between the longest and shortest pole-pitches of the polyphase windings P1 to P32.

As also pointed out in the Powers patent, it is necessary to provide energizing-means for energizing the polyphase stator-windings of poles P1 to P32, in sections to match the position of the armature 30 or the car 29. This is because the car-length is only a small part of the total useful plane-launching trackway-length, and if an attempt were made to energize the entire polyphase field at once, there would be imposed a prohibitive strain on the kva. capacity of the generator G, with very excessive magnetizing currents, resulting in a prohibitively low power-factor. It is necessary, therefore, at any moment, to energize only as many primary-winding poles P1 to P32 as are necessary to produce a traveling polyphase flux in the armature plate 30, or at least in a major part of the total length of the armature-plate 30. Any means to this end could be used.

Fig. 5 diagrammatically indicates, by way of example, the use of contact-shoes 50, which are carried by the car 29, and which make contact between a third rail 51 and a segmented rail 52 which is composed of a plurality of insulated rail-segments, one for each of the poles P1 to P32 of the polyphase windings. These segments of the segmented rail 52 are connected to three-phase circuit-breakers, switches, or contactors C1 to C32 which, when energized, connect the correspondingly numbered polyphase windings P1 to P32 to a three-phase bus 53, which is energized, by a three-phase starting-switch or circuit-breaker 54 from the generator G. It will be understood that the corresponding poles of the two primary-windings 41 and 42, on opposite sides of the primary-member gap 20, must be energized together, either in series or in parallel, from the same contactor-switch C1 to C32, as the case may be, so that the symmetrically disposed primary-winding poles, on opposite sides of the car 29 shall be simultaneously energized and deenergized, regardless of the slowness or rapidity of the operation of the contactor-switch which energizes them.

As the car 29 accelerates, it will be necessary to shorten some of the segments of the segmented rail 52, so that the segments corresponding to newly energized poles, in advance of the car 29, shall be reached by the contact-shoes 50 a little bit earlier, in order that the newly energized poles shall become completely energized by the time the car reaches the corresponding position along the trackway, as shown in Fig. 5, beginning at pole P10.

The polyphase generator G is represented as having a three-phase stator-member, and a rotating field-member, the latter being indicated by two rotor-winding slip-rings 55, which are energized, in series with a field-rheostat 56, across any suitable direct-current source, indicated by the positive and negative terminals (+) and (−).

In Fig. 5, the direct-current energy, for energizing the terminal direct-current stator-windings P33 to P48, at the run-terminating end of the trackway, is indicated as being obtained from a direct-current generator DC, which energizes a direct-current bus 57 through a control-switch or circuit-breaker 58. The direct-current generator DC is shown as having a field-winding 59 which is energized, through a field-rheostat 60, from the direct-current source-terminals (+) and (−).

During a normal plane-launching operation of our illustrated linear-motor catapult, in Fig. 5, the two main energizing-switches 54 and 58 are closed simultaneously. The polyphase switch 54 immediately energizes the first five poles P1 to P5 of the polyphase windings 41 and 42, corresponding to the number of rail-segments which are energized by the contact-shoes 50 of the car 29 at the starting-point. The car immediately starts up, therefore, accelerating very rapidly, and energizing the necessary track-sections ahead of it, while deenergizing the track-sections which are left behind, as the contact-shoes 50 move over the segmental rail 52.

At the same time, the closure of the braking-switch 58 energizes the direct-current braking-field, corresponding to the poles P33 to P48 at the end of the trackway, thus causing these poles to build up their direct-current flux at an exponential rate, so that, by the time the car reaches the end of its launching period, corresponding approximately to the last polyphase pole P32, the direct-current braking-field will be strongly established, and will strongly decelerate the car. When the car-speed is suddenly retarded, by this decelerating braking-action, the tow-line 38 automatically disengages itself from the plane, and the plane takes off, while the car is being quickly stopped.

The maximum or average acceleration, during the plane-launching part of the car-movement, is something like 3.2 G's, not only for the sake of the pilot, but in order to impose no undue mechanical strain on the plane. When the shuttle-car is being stopped at the end of the trackway, however, with nothing attached to it, a much higher deceleration-rate may be used, which may be something like 40 G's, so that the car is stopped very quickly, or at least slowed down to a speed at which its movement can be safely checked by a bumper or recoil-mechanism (not shown) at the extreme end of the field or trackway.

After the completion of a forward-run of the towing-car 29, it will be necessary to return the car to the starting-end of the runway, for another operation. In accordance with our present invention, we contemplate that this return-movement of the car may be effected by using some externally-connected towing-means for the car, such as a jeep or automobile of some kind (not shown), thus avoiding the complication of a self-propelled return-movement of the car.

The eddy-current plate 30 gets quite hot during each operation of the car, and it may be allowed to cool, by natural radiation or convection between runs, if the runs are not at too frequent intervals, or artificial cooling-means (not shown) may be used. It is usually sufficient to simply play a stream or streams of water (not shown) on the induction-plate 30 when the car has been hauled back to the starting-point, thus readying the car for another run.

In most linear-motor plane-launching catapults, it is necessary, as a practical matter, to use the same equipment for assisting plane-landings, as broadly described in the Jones Patent 2,484,230, granted October 11, 1949.

To this end, we have shown, in Fig. 5, a suitable plane-landing control-means, which is diagrammatically indicated as comprising two drum-controllers 64 and 68. The drum-controller 64 is indicated as being movable either to the right or the left, from its off-position 65, for the purpose of controlling the inclusion or exclusion of the polyphase contactors C8 to C32, so that whichever of these contactors are excluded by the drum-controller will not be energized by the corresponding sections of the sectionalized rail 52. In the right-hand position of the drum 64, a long contact-segment 66 completes the circuit from the negative bus (−), through each one of the operating-coils of the contactors C8 to C32, to its corresponding rail-segment 52, so that each of these contactors stands ready to be operated by the advancing movement of the car 29.

When the drum 64 is moved to the left of its off-position 65, a shorter, stepped, contact-segment 67 is brought into play, to control how many of the contactors C8 to C15 are to be connected into service, thus giving the operating-personnel a means for preselecting the number of poles during which the car is to be initially accelerated, at an extremely high acceleration, when it is racing to approximately match the speed of a plane which is coming in for a landing, as explained in the last-mentioned Jones Patent No. 2,484,230. We have indicated that this accelerating-run of the car can be chosen as lasting anywhere from the first seven poles to the first fifteen poles of the polyphase windings 41 and 42, according to the adjustment of the position of the drum-controller 64. These figures are only illustrative, and are intended to illustrate the fact that the accelerating-run of the car 29, in preparation for a plane-landing operation, occupies a relatively small part of the total length of the primary members 11 and 12.

During a plane-landing operation, the timing, the preselection of the length of the accelerating-time, and if necessary the speed of the prime mover and hence the frequency of the polyphase generator G, are all so chosen that the car-landing braking-gear (such as a tow-rope 38) engages the towing-hook 37 of the car immediately after the car obtains the necessary speed which is almost as great as the landing-speed of the incoming plane. Immediately after this connection is made, it is necessary to apply a strong braking-action to the plane, and this is accomplished by applying direct-current energization to some of the poles of the polyphase windings after the contact has been established between the swiftly moving landed plane and the car 29.

To this end, our diagrammatically indicated control-mechanism in Fig. 5 also includes the braking-controlling drum-controller 68, which has an off-position 69, and a stepped contactor 70, which can be adjusted, in different drum-positions, to energize a selected number of braking-contactors B12 to B32. These braking-contactors B12 to B32 are indicated as two-pole electromagnetic switches, circuit-breakers, or contactors, each of which energizes the correspondingly numbered polyphase-winding poles P12 to P32 from the direct-current braking-bus 57. The regular direct-current braking-windings P33 to P48 are of course also energized whenever the direct-current braking-bus 57 is energized.

By means of the drum-controller 68, the operating-personnel may make a pre-selection of the number of poly-phase-winding poles which are to be energized with direct current for braking-purposes, for the purpose of stopping the landed plane after it has come down on to the landing-field and made contact with the car 29. Thus, as illustrated in Fig. 5, drum-notches are provided whereby the operating personnel can pre-select anything from poles P20 through P32, to poles P12 through P32, for the direct-current braking-energization of the polyphase windings, depending upon the position of the drum-controller 68.

For a plane-landing operation, therefore, the two control-circuit drums 64 and 68 are first set to control, respectively, the accelerating-distance and the braking-distance for the shuttle-car 29. Then, at the right moment, as the plane is just about to land, the switches 54 and 58 are closed, and the plane-landing operation is started, usually by automatic means (not shown) as described in the Jones plane-landing Patent 2,484,230.

The reduced weight of our skeletonized towing car 29, with its non-magnetizable eddy-current plate 30, is extremely useful in facilitating the plane-landing operation, because the reduced weight of the car imposes a much smaller shock on the plane-contacting gear, and a much smaller mechanical strain on the plane itself, when this contact is first made. Thus, it is not necessary, with our improved catapult, to match the car-speed to the landing-speed of the plane as meticulously as was required with the much heavier towing-car of the Jones plane-landing Patent 2,484,230.

In some cases, it may be desirable, or even necessary, to change the timing of the effective energizations of some of the three-phase contactors C1 to C32, particularly those after the first few contactors, say, after the first five contactors. This may be necessary, in order to compensate for the different car-speeds or different rates of car-acceleration, which are needed for launching different kinds of planes, or for changing from plane-launching to plane-landing conditions. Some sort of contactor-timing regulating-means is therefore desirable, at least in many cases, to supplement the fixed contactor-timing control which is determined by the lengths or positions of the respective segments of the segmented rail 52. In plane-landing operations, such contactor-timing control-means is desirable, not only for the purpose of adjusting for maximum acceleration, at times, but also for the purpose of deliberately introducing delayed energization of some of the three-phase contactors, at times, for the purpose of making fine adjustments in the rate of acceleration of the car, preliminary to being contacted by an incoming plane.

We have accordingly shown a symbolic or broadly representative contactor-regulating time-adjustment means, which is intended to be broadly representative of any means for this general purpose. Thus, in Fig. 5, we have shown, in series with the energizing-coils of the three-phase contactors from C6 through C32, a correspondingly numbered variable reactor X6 to X32, respectively. The contactor-energizing circuits are direct-current circuits, energized across the direct-current bus-terminals (+) and (−) as shown, and the adjustable reactors X6 to X32 serve as a means for controlling the rate of build-up of the direct current in the respective energizing-circuits of the contactors C6 to C32, when these circuits are first energized. In this way, a control can be exercised over the time-delay which occurs between the initial closing of the contactor-energizing circuit and the attainment of a current-strength sufficient to actuate the respective contactors. The various time-controlling reactors X6 to X32 can be independently or individually manually controlled, or gang-operated, or automatically operated by any suitable automatic or interlocking means (not shown). The essential thing, so far as our present invention is concerned, is that suitable timing-adjustment means may be made available to the operating personnel in charge of plane-launchings and plane-landings.

It will be understood that the details of the structural shapes and of the electrical control-diagrams which we have given are intended only as being illustrative of the broad generic principles of the invention, and not as limiting ourselves to these precise details. We have made no effort to illustrate many features which would be obvious to the structural designer or to the control-circuit designer. We have omitted all of the many push-button controls, and operational signalling safeguards and interlocks, which would necessarily be used in any successful installation, as suitable devices for embodying these features are believed to be within the skill of anyone qualified to build our apparatus. We desire, therefore, that the appended claims shall be accorded the broadest construction consistent with their language.

We claim as our invention:

1. A linear-motor assembly comprising, in combination: a trackway of considerable length; a relatively short car which is guided along said trackway, said car having a plate, made substantially of non-magnetic conducting material, secured thereto, extending out therefrom, and extending in a lengthwise direction, said plate constituting the armature of the linear motor; an elongated linear-motor stator-structure extending substantially the entire useful length of the trackway, said stator-structure comprising two substantially identical, inwardly facing, polyphase-wound magnetizable primary members disposed in planes parallel to said plate, and spaced from each other by a slot within which said plate moves, with a linear-motor airgap on each side of said plate, between said plate and the respective primary members; and energizing-means for energizing the polyphase stator-windings in sections to match the armature-position, the winding-arrangement and the energizing-means being such that, at all instants and at all places along the plate, wherever there is a north pole on one side of the plate, there is a south pole of substantially equal strength, substantially exactly opposite to said north pole, on the other side of the plate.

2. The invention as defined in claim 1, characterized by said plate being made altogether of nonmagnetic conducting material.

3. The invention as defined in claim 1, characterized by said plate having sufficient lateral flexibility to substantially center itself within its slot, under the influence of the lateral forces produced by the substantially equal and opposite magnetic poles on the opposite sides thereof.

4. The invention as defined in claim 1, characterized by said inwardly facing primary members having winding-receiving slots, separated by teeth, on the airgap-faces of said primary members, the teeth being so disposed that each tooth of one primary member is substantially exactly opposite to a corresponding tooth of the other primary member, throughout the entire useful length of the trackway.

5. The invention as defined in claim 4, characterized by said plate being made altogether of non-magnetic conducting material and having sufficient lateral flexibility to substantially center itself within its slot, under the influence of the lateral forces produced by the substantially equal and opposite magnetic poles on the opposite sides thereof.

6. A linear-motor assembly comprising, in combination: a trackway of considerable, but limited, length; a relatively short car which is guided along said trackway, said car having a plate, made substantially of non-magnetic conducting material, secured thereto, extending out therefrom, and extending in a lengthwise direction, said plate constituting the armature of the linear motor; an elongated linear-motor stator-structure extending substantially the entire useful length of the trackway, said stator-structure comprising two substantially identical, inwardly facing magnetizable primary members disposed in planes parallel to said plate, and spaced from each other by a slot within which said plate moves, with a linear-motor airgap on each side of said plate, between said plate and the respective primary members; direct-current exciting-windings on a short length of said magnetizable primary members at the run-terminating end of said trackway; polyphase primary windings on substantially all of the remainder of said magnetizable primary members; braking-means for energizing said direct-current exciting-windings with direct current in time to retard the car when it reaches said end of the trackway; a first control-means operative to energize substantially all of said polyphase primary windings with polyphase currents in progressibly energized sections to match the armature-position; and a second control-means comprising car-accelerating energizing-means for energizing a relatively short initial part of said polyphase primary windings with polyphase currents for accelerating said car, and car-braking energizing-means for energizing a relatively long terminal part of said polyphase primary windings with direct current for decelerating said car, the winding-arrangement and the energizing-means being such that, at all instants and at all places along the plate, wherever there is a north pole on one side of the plate, there is a south pole of substantially equal strength, substantially exactly opposite to said north pole, on the other side of the plate.

7. The invention as defined in claim 6, characterized by said plate being made altogether of non-magnetic conducting material.

8. The invention as defined in claim 6, characterized by said plate having sufficient lateral flexibility to substantially center itself within its slot, under the influence of the lateral forces produced by the substantially equal and opposite magnetic poles on the opposite sides thereof.

9. The invention as defined in claim 6, characterized by said inwardly facing primary members having winding-receiving slots, separated by teeth, on the airgap-faces of said primary members, the teeth being so disposed that each tooth of one primary member is substantially exactly opposite to a corresponding tooth of the other primary member, throughout the entire useful length of the trackway.

10. The invention as defined in claim 9, characterized by said plate being made altogether of non-magnetic conducting material and having sufficient lateral flexibility to substantially center itself within its slot, under the influence of the lateral forces produced by the substantially equal and opposite magnetic poles on the opposite sides thereof.

11. A linear-motor assembly comprising, in combination: a trackway of considerable, but limited, length; a relatively short car which is guided along said trackway, said car having a plate, made substantially of non-magnetic conducting material, secured thereto, extending out therefrom, and extending in a lengthwise direction, said plate constituting the armature of the linear motor; an elongated linear-motor stator-structure extending substantially the entire useful length of the trackway, said stator-structure comprising two substantially identical, inwardly facing magnetizable primary members disposed in planes parallel to said plate, and spaced from each other by a slot within which said plate moves, with a linear-motor airgap on each side of said plate, between said plate and the respective primary members; direct-current exciting-windings on a short length of said magnetizable primary members at the run-terminating end of said trackway; polyphase primary windings on substantially all of the remainder of said magnetizable primary members; braking-means for energizing said direct-current exciting-windings with direct current in time to retard the car when it reaches said end of the trackway; and means for energizing said polyphase primary windings with polyphase currents in progressively energized sections to match the armature-position, the winding-arrangement and the energizing-means being such that, at all instants and at all places along the plate, wherever there is a north pole on one side of the plate, there is a south pole of substantially equal strength, substantially exactly opposite to said north pole, on the other side of the plate.

12. The invention as defined in claim 11, characterized by said plate being made altogether of non-magnetic conducting material.

13. The invention as defined in claim 11, characterized by said plate having sufficient lateral flexibility to substantially center itself within its slot, under the influence of the lateral forces produced by the substantially equal and opposite magnetic poles on the opposite sides thereof.

14. The invention as defined in claim 11, characterized by said inwardly facing primary members having winding-receiving slots, separated by teeth, on the airgap-faces of said primary members, the teeth being so disposed that each tooth of one primary member is substantially exactly opposite to a corresponding tooth of the other primary member, throughout the entire useful length of the trackway.

15. The invention as defined in claim 14, characterized by said plate being made altogether of non-magnetic conducting material and having sufficient lateral flexibility to substantially center itself within its slot, under the influence of the lateral forces produced by the substantially equal and opposite magnetic poles on the opposite sides thereof.

16. A linear-motor assembly, comprising, in combination: a trackway of considerable, but limited, length; a relatively short car which is guided along said trackway, said car having a plate, made substantially of non-magnetic conducting material, secured thereto, extending out therefrom, and extending in a lengthwise direction, said plate constituting the armature of the linear motor; an elongated linear-motor stator-structure extending substantially the entire useful length of the trackway, said stator-structure comprising two substantially identical, inwardly facing, polyphase-wound magnetizable primary members disposed in planes parallel to said plate, and spaced from each other by a slot within which said plate moves, with a linear-motor airgap on each side of said plate, between said plate and the respective primary members; control-means comprising car-accelerating energizing-means for energizing an initial part of the polyphase primary windings with poly-phase currents for accelerating said car, and car-braking energizing-means for energizing a terminal part of said polyphase primary windings with direct current for decelerating said car, the winding-arrangement and the energizing-means being such that, at all instants and at all places along the plate, wherever there is a north pole on one side of the plate, there is a south pole of substantially equal strength, substantially exactly opposite to said north pole, on the other side of the plate.

17. The invention as defined in claim 16, characterized by said plate being made altogether of non-magnetic conducting material.

18. The invention as defined in claim 16, characterized by said plate having sufficient lateral flexibility to substantally center itself within its slot, under the influence of the lateral forces produced by the substantially equal and opposite magnetic poles on the opposite sides thereof.

19. The invention as defined in claim 16, characterized by said inwardly facing primary members having winding-receiving slots, separated by teeth, on the airgap-faces of said primary members, the teeth being so disposed that each tooth of one primary member is substantially exactly opposite to a corresponding tooth of the other primary member, throughout the entire useful length of the trackway.

20. The invention as defined in claim 19, characterized by said plate being made altogether of non-magnetic conducting material and having sufficient lateral flexibility to substantially center itself within its slot, under the influence of the lateral forces produced by the substantially equal and opposite magnetic poles on the opposite sides thereof.

FRANK W. GODSEY, JR.
MAURICE F. JONES.

References Cited in the file of this patent
UNITED STATES PATENTS

| Number | Name | Date |
|---|---|---|
| 1,929,990 | Rose | Oct. 10, 1933 |
| 2,112,264 | Bowles | Mar. 29, 1938 |
| 2,135,373 | Wilson | Nov. 1, 1938 |
| 2,404,984 | Powers | July 30, 1946 |
| 2,484,230 | Jones | Oct. 11, 1949 |
| 2,508,167 | Jones | May 16, 1950 |